Sept. 11, 1951          L. O. CARLSEN          2,567,273

METHOD AND MACHINE FOR CUTTING GEARS

Filed Aug. 1, 1947                                              5 Sheets-Sheet 1

LEONARD O. CARLSEN
Inventor

By
Attorney

Sept. 11, 1951    L. O. CARLSEN    2,567,273
METHOD AND MACHINE FOR CUTTING GEARS
Filed Aug. 1, 1947    5 Sheets-Sheet 2

LEONARD O. CARLSEN
Inventor

Sept. 11, 1951 L. O. CARLSEN 2,567,273
METHOD AND MACHINE FOR CUTTING GEARS
Filed Aug. 1, 1947 5 Sheets-Sheet 3
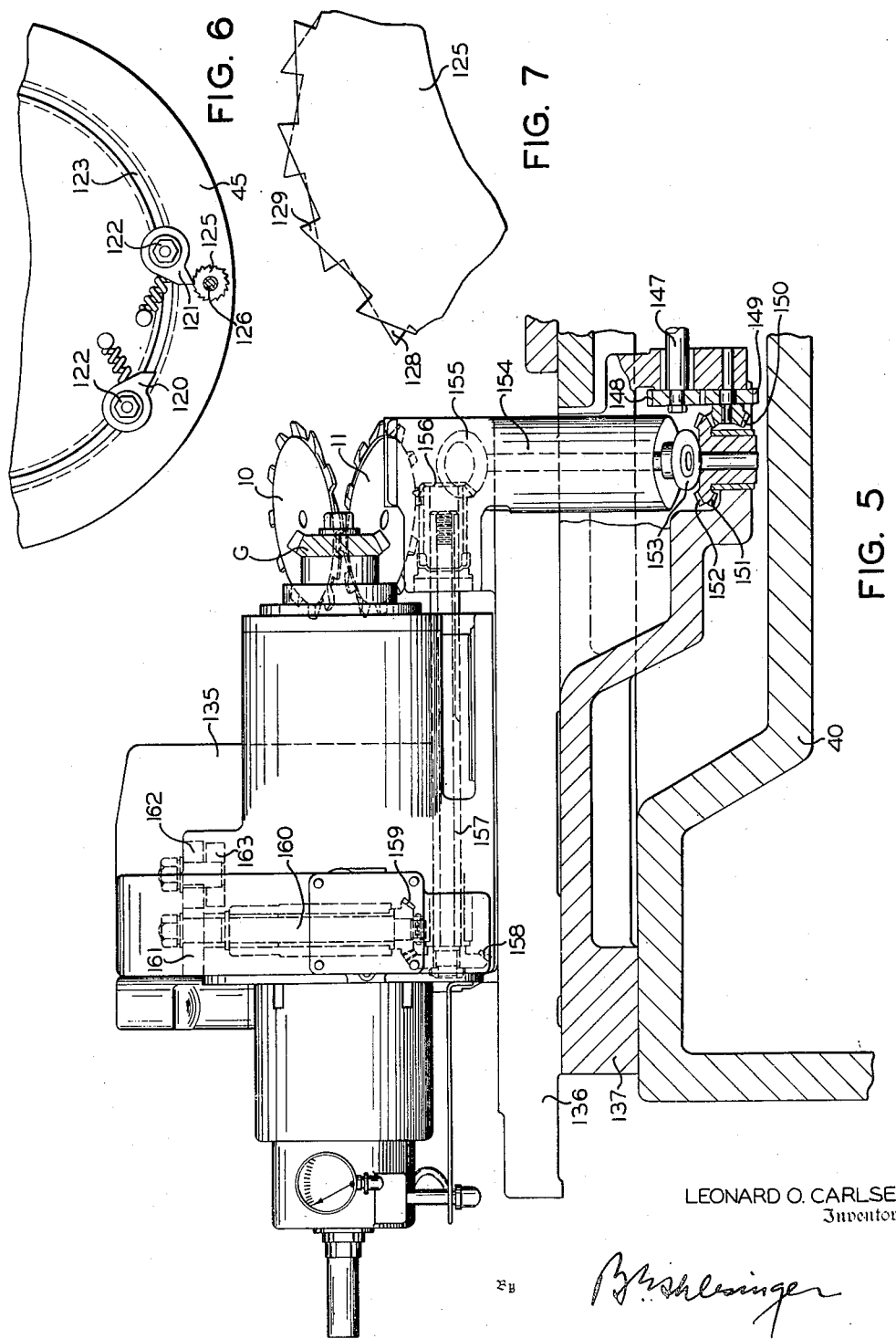
LEONARD O. CARLSEN
Inventor
Attorney Sept. 11, 1951  L. O. CARLSEN  2,567,273
METHOD AND MACHINE FOR CUTTING GEARS
Filed Aug. 1, 1947  5 Sheets-Sheet 4

LEONARD O. CARLSEN
Inventor

By *B. Schlesinger*

Attorney

Sept. 11, 1951     L. O. CARLSEN     2,567,273
METHOD AND MACHINE FOR CUTTING GEARS
Filed Aug. 1, 1947     5 Sheets-Sheet 5

LEONARD O. CARLSEN
Inventor

By *B.E. Ahlringer*
Attorney

Patented Sept. 11, 1951

2,567,273

UNITED STATES PATENT OFFICE 2,567,273

METHOD AND MACHINE FOR CUTTING GEARS

Leonard O. Carlsen, Rochester, N. Y., assignor to Gleason Works, Rochester, N. Y., a corporation of New York Application August 1, 1947, Serial No. 765,291

25 Claims. (Cl. 90—3)

The present invention relates to a method and to apparatus for producing toothed parts, and particularly to a method and machine for cutting straight-toothed bevel gears and straight-tooth face coupling or clutch members.

Where straight bevel gears are to be produced in high-production quantities, the process of the Wildhaber U. S. Patent No. 2,357,153, granted August 29, 1944, may be used. This process has the advantage that the gears can be completed (roughed and finished) from the solid in a single set-up, with a single tool, and in a single operation. The process is not designed, however, for use on jobs where the numbers of gears of a particular ratio that are to be cut at one time are relatively small. The cutter required by the process is expensive, and while it can be used for cutting gears of different ratios, the range of usefulness of a particular cutter is quite limited. Successive blades of these cutters have to be made of different effective profile shape to cut at different points along the length of a tooth space. Moreover, in this process the cutter must be reciprocated along the length of a tooth space to be cut, and the reciprocatory movement on the cutter must be timed accurately to its rotary movement.

Where the number of pieces to be produced on a given run is not large, the conventional practice is to rough out the tooth spaces of the blank first and then to finish-cut the teeth in a separate operation and in a separate machine. In the finishing operation, a pair of reciprocating tools are ordinarily employed.

In my pending application Serial No. 707,079, filed November 1, 1946, I have disclosed a method for cutting straight-toothed bevel gears and face clutches or coupling members in which a pair of interlocking disc cutters are used, each of which has a plurality of straight-profiled roughing blades of progressively increasing height followed by one or more straight-profiled finishing blades which are adapted to cut the full height of the finished tooth space. These cutters are designed to cut the blank from the solid and to complete a tooth space on each revolution, but this process is suited only to cut one member of a pair of bevel gears, and only for the production of form-cut face clutch or coupling members. Moreover, this process, like the process of the Wildhaber patent mentioned, has its limitations with respect to small volume production. The cutters are special in that for a given diameter of cutter a limited number of roughing cuts can be taken and a limited number of finishing cuts, and no more stock can be removed from a tooth space than can be handled practically in a revolution of the cutters.

One object of the invention is to provide a process and machine for finish-cutting straight bevel gears and straight-toothed face coupling or clutch members from the solid in a single operation which will permit of using cutters of simpler construction and adapted for more universal use than the cutters of the Wildhaber patent mentioned or of my prior application.

Another object of the present invention is to provide a process and machine for finish-cutting straight bevel gears from the solid in a single operation and in a single set-up, which is applicable to the production of both members of a pair of bevel gears.

A further object of the invention is to provide a method and machine for finish-cutting a straight bevel gear or a face clutch or coupling member from the solid in a generating operation.

Another object of the invention is to provide a method and machine for finish-cutting a straight bevel gear or a straight-toothed face clutch or coupling member from the solid in a generating operation in which any desired number of cuts can be taken on the sides of the tooth spaces of the work and any desired quality of tooth-surface finish can be obtained.

Another object of the invention is to provide a method for finish-cutting toothed parts of the character described from the solid with disc-milling cutters and without lengthwise feed of these cutters across the face of the work.

Still another object of the invention is to provide a method and machine for finish-cutting straight-toothed gears and face clutch or coupling members from the solid in which a pair of disc-milling cutters are employed to cut, respectively, opposite sides of the tooth spaces of the work and in which the cutting edges at one side of each cutter are used to rough-cut the sides of the tooth spaces and the cutting edges at the opposite side of each cutter are saved for the finish-cutting operation to produce clean, smooth finishing cuts.

Another object of the invention is to provide a machine on which a wide variety of various forms of toothed gears may be cut.

A still further object of the invention is to provide a method for cutting gears or clutches in a generating operation by which tooth surfaces may be produced on the work which are a counterpart of the cutting surface of the tool, that is, which are the same as the tooth surfaces that might be cut by the tool in a form-cutting or non-generating operation.

Other objects of the invention will be apparent hereinafter from the specification and from the recital of the appended claims.

For producing gears or face coupling members according to the embodiment of the present invention illustrated in the drawings, a pair of disc-milling cutters are employed. Each cutter has finish side-cutting edges at one side which are perpendicular to its axis and rough-cutting edges at its opposite side which are of straight profile and lie in a conical surface coaxial with the cutter. The two cutters are positioned to cut simultaneously in the same tooth space of the work. They are so adjusted that the planes of their respective perpendicular side-cutting edges are inclined to the pitch plane of the work at the pressure angle of the work, that is, the plane side-cutting surfaces of the cutters are inclined to one another at the angle included between the opposite profiles of the tooth space to be cut, thereby to cut the desired pressure angles on opposite sides of the tooth space. The cutters are also so adjusted that the planes of their respective perpendicular side-cutting edges are inclined to one another in accordance with the desired lengthwise taper of the tooth spaces of the bevel gear or clutch which is to be cut, thereby to produce on the work the desired convergence of the sides of a tooth space from the outer to the inner end thereof. To allow both cutters to cut simultaneously, one cutter is adjusted angularly about its axis relative to the other so that the blades of the two cutters will in effect interfit or interlock as they rotate and will engage the blank alternately. The cutters are intended to cut without lengthwise feed along the tooth space and are positioned longitudinally of the tooth space in accordance with the point at which the greatest depth of tooth space is desired.

The cutters are so positioned also relative to one another that during rough-cutting of a tooth space, the conical sides of the two cutters engage opposite sides of a tooth space. At the end of the rough-cutting operation they are shifted axially and also depthwise, to bring the plane sides of the cutters into engagement with the opposite sides of the tooth space to finish-cut the same. The depthwise shift is to compensate for the axial shift and maintain the desired depth of cut.

If the cutting is done in a generating operation, the cutters are fed into the blank in roughing until full depth position is reached and they are rolled relative to the blank in one direction to rough-generate a tooth space of the blank. As soon as the rough-cutting roll is finished, the cutters are shifted axially and depthwise. Then the cutters and blank are rolled in the opposite direction so that the finish-cutting edges of the two cutters may generate the opposite sides of the tooth space. When the tooth space has been completed, the cutters are withdrawn from engagement with the work; the work is indexed and the cutters are shifted back to their original relative positions. Then they are fed back into engagement with the work, to begin a new cutting cycle.

One of the features of the new machine of the present invention is that each cutter is mounted for angular adjustment about an axis that lies in a plane containing the cutter axis. Thus, the cutters may be adjusted to cut gears conjugate to a true crown gear, to cut pinions conjugate to non-generated gears, to control tooth profile shape, etc. Known machines heretofore built for cutting straight bevel gears with disc-milling cutters were capable only of cutting gears conjugate to a nominal crown gear, that is, a gear having a face angle of 90° but a pitch angle of less than 90°.

Further than this, it is possible by cutting gears or face-clutches according to one embodiment of the invention to use a generating type machine built according to this invention in the generation of gears or face-clutches having tooth surfaces whose profile shapes are identical with those of the cutters. Thus, gears or clutches can be produced on the machine which have tooth profile shapes as though they had been form-cut. In the production of a tapered gear or face-clutch by this method, the work is so adjusted on the machine that its axis is aligned with the axis of the cradle of the machine, and during cutting the work and cradle are swung at the same rate about their respective axes. This causes the cutter or cutters to produce the desired tooth shape. Thus, a generating machine built according to the present invention may be used not only for generating gears conjugate to any given basic gear but also for producing gears having formed tooth shapes.

In the drawings:

Fig. 5 is a fragmentary view, partly in section and partly in elevation, showing the work head end of the machine;

Fig. 6 is a detail view on an enlarged scale showing the ratchet and pawl mechanism for shifting the valve that controls the axial and depthwise movement of the cutters, the view being a section on the line 6a of Fig. 4;

Fig. 7 is a fragmentary view on a still further enlarged scale showing the two ratchet wheels of this shifting mechanism;

Figures 1, 2, 3, 8:
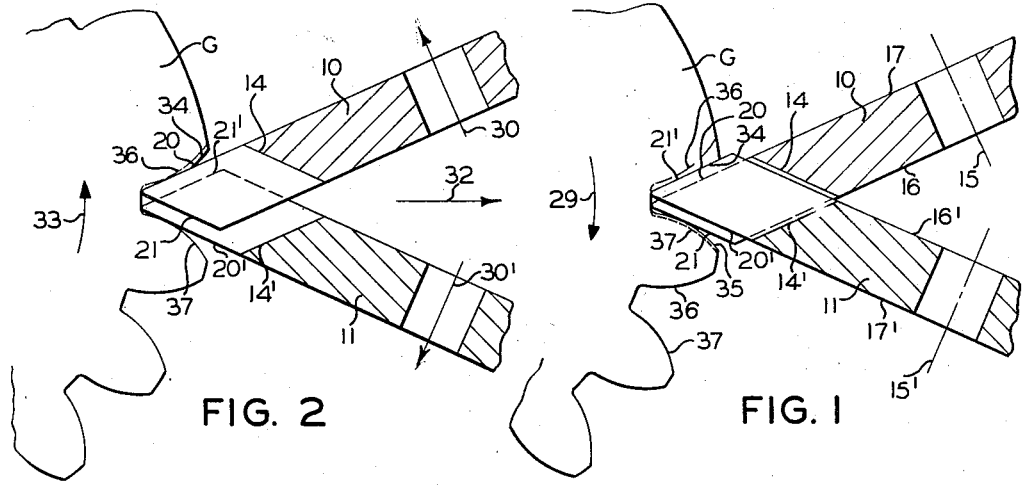
Fig. 1 is a diagrammatic view showing the positions of the cutters relative to the gear blank during rough-cutting.
Fig. 2 is a corresponding view illustrating diagrammatically the relative positions of cutters and blank during finish-cutting and showing how these cutters are shifted between rough-cutting and finish-cutting operations.
Fig. 3 is a plan view showing the two cutters in the process of cutting a tooth space of a straight-tooth bevel pinion.
Fig. 8 is a diagrammatic view illustrating the connection between the shift valve and the fluid pressure operated parts which are controlled thereby.

Referring now to the drawings by numerals of reference, 10 and 11 denote, respectively, the two cutters of a pair of cutters such as may be employed for practicing the present invention. Each cutter is of the disc-milling type and the two cutters may be identical except that they are of opposite hand. Because of this relative identity of the two cutters, the same reference numerals will be used in denoting like parts of the two cutters, except that in the case of the cutter 11 these reference numerals will be primed.

In the embodiment of the invention shown in the drawings, the blades 12 and 12', respectively, of the cutters are integral with the body portions of the cutters and are formed by gashing the cutters at suitable intervals around their peripheries. The bottoms 14 and 14' of the gashes between successive blades of each cutter are inclined to the axes 15 and 15', respectively, of the two cutters, and the gashes of one cutter are of sufficient angular extent to receive readily the blades of the other cutter as the two cutters rotate together.

Each blade may be sharpened straight across to have side-cutting edges at both its sides, or alternate blades of a cutter may be sharpened with opposite side rake to have opposite side-cutting edges at opposite sides. The side-cutting edges 20 at one side of the cutter 10 lie in a plane surface perpendicular to the axis 15 of that cutter while the side-cutting edges 21 at the opposite side of that cutter lie in a conical surface coaxial with the cutter. Similarly, the opposite side-cutting edges 20' and 21' of the cutter 11 lie, respectively, in a plane surface perpendicular to the axis of the cutter and in a conical surface coaxial of the cutter axis 15'. The angle included between opposite side-cutting edges 20 and 21 or 20' and 21' of each cutter is preferably made equal to the included angle between opposite sides of a tooth space of the gear or clutch member to be cut. The blades of each cutter are relieved on their tip and side faces back of their front faces to provide cutting clearance. These blades are all of the same height and preferably identical. They are preferably uniformly spaced around the periphery of the cutter.

Figure 11:
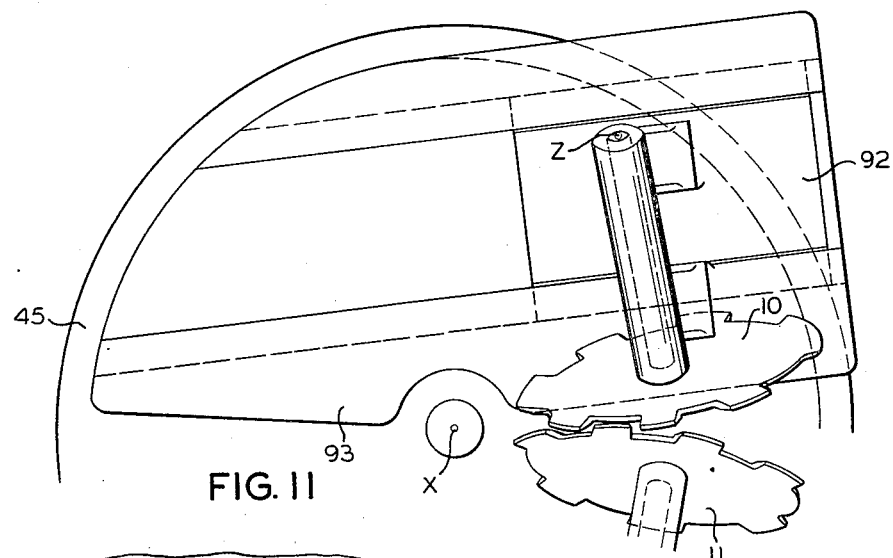
Fig. 11 is a more or less diagrammatic view showing how the cutter is mounted on the cradle for adjustment.

In use, the two cutters are positioned with their axes 15 and 15' inclined to one another at the supplement of the angle included between opposite sides of a tooth space of the work to be cut, so that the angle included between the planes of the side-cutting edges 20 and 20' will equal the included pressure angle of opposite sides of a tooth space to be cut in the work. The cutters will also be positioned relative to one another, as shown in Figs. 3 and 11 so that the planes of the side-cutting edges 20 and 20' converge from the outer to the inner end of a tooth space of the work to cut a tooth space tapering in width from end to end, as required.

Fig. 1 shows the positions of the cutters during the roughing operation. Here the two cutters are located relative to one another so that the rough-cutting edges 21 and 21' of the two cutters project laterally beyond the finish-cutting edges 20 and 20' of the cutters as the successive blades of the two cutters rotate into cutting position. In this position, the roughing edges 21 and 21' and the tip-cutting edges 25 and 25' of the two cutters will do the cutting; and the finishing edges 20 and 20' will be saved for the subsequent finish-cutting operation.

In the roughing operation, the cutters may be fed depthwise into the blank, or full cutting depth may be reached by the generating roll between cutters and work. Generation may be effected in the usual manner by rotating the work on its axis and producing an additional motion between the work and the cutters about a separate axis. In the case of a bevel gear, this separate axis usually represents the axis of a basic gear of which the cutters represent a tooth. Figs. 1 and 2 illustrate cutting in a generating roll. When the cutters are rotated on their respective axes 15 and 15', then, and the relative rolling motion in one direction, as denoted by arrow 29, is produced between the cutters and the work, here shown as a bevel pinion blank G, the side-cutting edges 21 and 21' of the two cutters will rough-generate a tooth space in the work whose opposite sides are denoted at 34 and 35, respectively. 36 and 37 represent in dotted lines the positions of the finished sides of this tooth space.

At the end of the roughing roll, the cutters are shifted axially as denoted by the arrows 30 and 30' in Fig. 2 to shift the rough-cutting edges 21' and 21 out of cutting position and to shift the finish-cutting edges 20 and 20' into cutting position. Since the axial shift of the cutters will change the depth of engagement of the tools with the work, they are simultaneously shifted depthwise as denoted by the arrow 32 to maintain the desired depth of engagement.

Then, the direction of generating roll is reversed as denoted by the arrow 33 in Fig. 2, and the sides 36 and 37 of the tooth space are finish-cut by finish-cutting edges 20 and 20' of the cutters as the cutters rotate on their respective axes and are rolled relative to the blank in the return generating roll.

The cutters may be rolled clear of the blank at the end of the return roll, but preferably will be withdrawn depthwise. Then the blank is indexed so that on the next cutting cycle another tooth spaced of the work may be successively roughed and finished. During indexing the cutters are shifted axially in the reverse directions to the arrows 30 and 30' to return them to the relative positions shown in Fig. 1 and simultaneously they are readjusted depthwise in the direction reverse to the arrow 32 so that when they re-engage the blank after indexing they will be in the proper position, shown in Fig. 1, for rough-cutting a tooth space.

Figure 4:
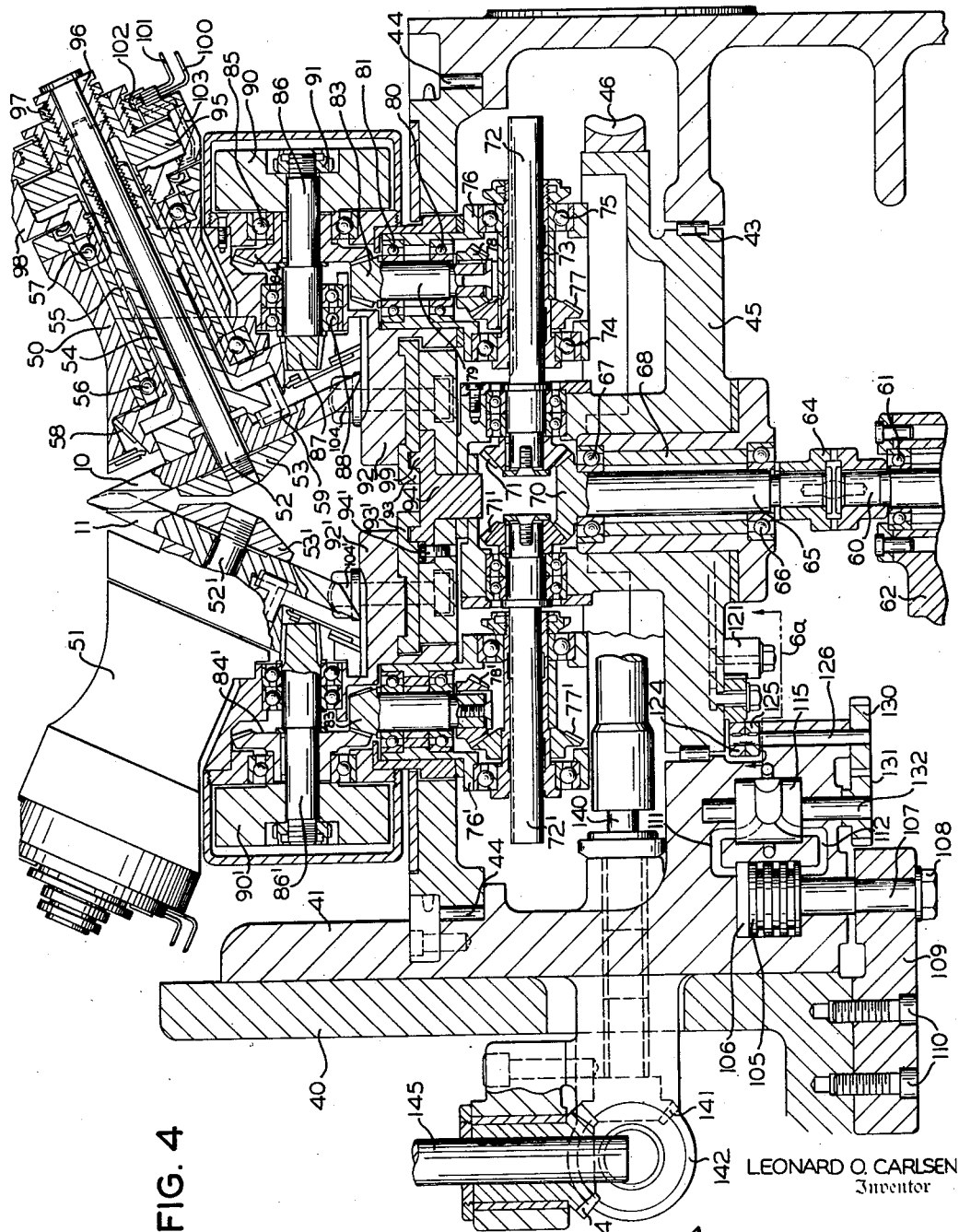
Fig. 4 is a sectional view in a vertical plane showing the tool-carrying cradle, the way in which the tools are mounted thereon, the drives to the tools, and the means for shifting the tools axially and depthwise, the tools being shown in the zero positions of their several adjustments.

One way in which a machine may be constructed to cut gears according to the present invention is illustrated in Figs. 4 to 10 inclusive. 40 designates the base or frame of the machine. Mounted on the frame 40 for sliding movement toward and away from the work is a carriage 41 (Fig. 4). Rotatably journalled in this carriage on spaced bearings 43 and 44, is a cradle 45. This cradle is adapted to be driven through a worm (not shown) and a worm wheel 46 that is secured to the cradle. The worm may be driven from a motor mounted in the base of the machine or from any other suitable source of power.

Mounted on the front face of the cradle for angular adjustment thereon about an axis X (Fig. 11) coinciding with the axis of the cradle are the two tool heads 50 and 51. The two cutters 10 and 11 are mounted on the two heads 50 and 51.

The mounting and drives to the two cutters are identical except for their reversed relationship. One only will be described and corresponding parts of the other mounting and drive will be designated by corresponding reference numerals primed.

The cutter 10 is secured by means of the drawbolt 52 and clamping plate 53 in a sleeve 54. This sleeve 54 has an enlarged head at its front end which is connected by a key 59 to the headed front end of a sleeve 55. The sleeve 55 is journalled in the tool head 50 on spaced anti-friction bearings 56 and 57. There is a bevel gear 58 formed integral with the front end or head of the sleeve 55. The drive to the tool 10 is transmitted through this bevel gear 58.

The drive is from a shaft 60 which is journalled on anti-friction bearings 61 in a bracket 62 that is connected in any suitable manner to the slide 41 to travel therewith. The shaft 60 is connected by a suitable face coupling 64 to a coaxial shaft 65. This shaft is journalled on spaced anti-friction bearings 66 and 67 in a sleeve 68 that is coaxial of the cradle 45. The sleeve 68 has a flange at its rear end that is bolted or otherwise secured to the rear face of the cradle.

Integral with the shaft 65 at its front end is a bevel gear 70 which meshes with the bevel gears 71 and 71' of the two tool drives. The bevel gear 71 is keyed to one end of a shaft 72 which has a telescoping sliding key engagement with a sleeve 73. The sleeve 73 is journalled in a bracket 76 on spaced anti-friction bearings 74 and 75. Keyed to the sleeve 73 is a bevel gear 77. This meshes with a bevel pinion 78 which is keyed to a shaft 79.

The shaft 79 is journalled on anti-friction bearings 80 and 81 in the bracket 76. Integral with the shaft 79 at its forward end is a bevel pinion 83. This meshes with a bevel gear 84 which is journalled in the tool head 50 on an anti-friction bearing 85. The bevel gear 84 is keyed to a shaft 86 that has a bevel pinion 87 integral with it at its forward end and that is journalled adjacent its forward end on a pair of anti-friction bearings 88. The pinion 87 meshes with and drives the gear 58, thus driving the cutter 10. A fly wheel 90 is keyed or otherwise fastened to the shaft 86 and is held against axial movement thereon by a nut 91 which threads onto the shaft 86.

Figure 9:
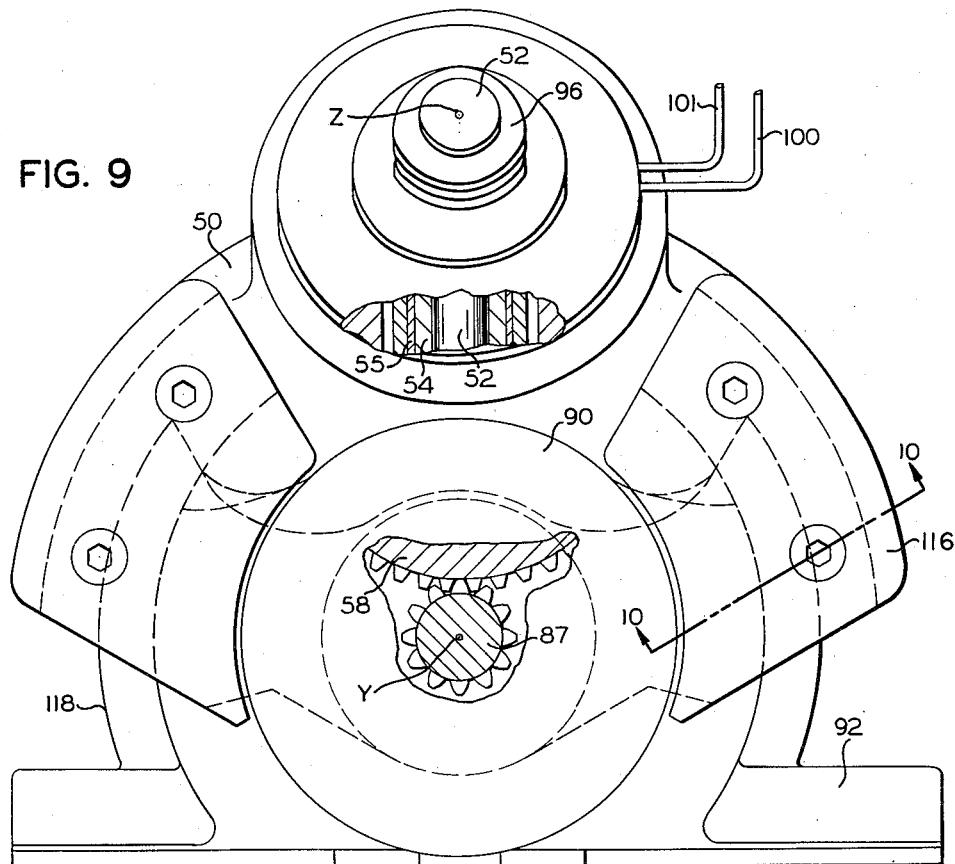
Fig. 9 is a view on a considerably enlarged scale looking at the rear of one of the cutter heads, parts being broken away.
Figure 10:
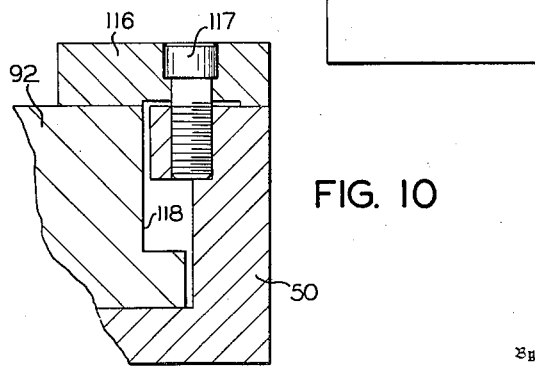
Fig. 10 is a section on the line 10—10 of Fig. 9.

The brackets 76 and 76' are secured in slides 92 and 92' that are adjustable rectilinearly on arm 93 and 93', respectively. The two arms 93 and 93' are adjustable angularly about the axis X of the cradle 45. The heads 50 and 51 are mounted on the slides 92 and 92', respectively, for angular adjustment, respectively, about the axes of shafts 86 and 86' which extend at right angles to the axis X of the cradle. A guide member 94 that is secured centrally of the cradle by screws 94' serves to guide the arms 93 and 93' in their angular adjustment on the cradle. This guide member has a circular guide-rib 99 that engages in arcuate recessed guide-ways formed on the back or undersurface of arms 93 and 93'. Bolts 104 and 104', which engage in T-slots formed in the front face of the cradle 45, serve to secure, respectively, slide 92 and arm 93, and slide 92' and arm 93' in their positions of adjustment. The head 50 is adapted to be secured on slide 92 in any position of its angular adjustment by gibs 116 and screws 117 (Figs. 9 and 10). The slide 92 has arcuate peripheral surfaces 118 concentric with the axis Y of shaft 86 to permit this adjustment. The slide 92' is similarly constructed.

The angular adjustment of arms 93 and 93' permit of inclining the cutters 10 and 11 to one another in accordance with the lengthwise taper in width of the tooth spaces to be cut. The radial adjustment of slides 92 and 92' on arms 93 and 93', respectively, permit of adjusting the cutters in accordance with the cone distance of the gear to be cut, that is, in accordance with the distance of a mean point in the tooth zone of the work from the gear or clutch apex or center. The angular adjustment of the heads 50 or 51 on the slides 92 and 92', respectively, permit of cutting workpieces of various forms as will be described more particularly hereinafter.

The cutters 10 and 11 are adapted to be shifted axially, as already described, to bring the rough-cutting and finish-cutting edges at opposite sides of the tools alternately into cutting engagement with the blank. For this purpose a fluid pressure operated piston is provided to shift each cutter. The mechanisms for shifting the two cutters are identical and one only will be described in detail, the corresponding parts of the other being identified by corresponding reference numerals that are primed. The piston 95 for shifting cutter 10 axially threads onto a nipple 96 which in turn is threaded into the sleeve 54 so that, as the piston moves, the sleeve 54 and cutter 10 move axially with it. A nut 97 that threads onto the outer end of the nipple 96 serves to secure the piston in any adjusted position along the sleeve. The piston is adapted to reciprocate in a cylinder 98 that threads onto sleeve 55. The pressure fluid is admitted to opposite sides of the piston 95 through pipes 100 and 101 which connect with ducts 102 and 103, respectively, formed in the wall of the cylinder 98 and communicating, respectively, with opposite sides of the piston.

Simultaneously with the axial shift of the tools, the slide 41 must be moved toward or from the work to effect depthwise shift of the tools for the purpose described with reference to Fig. 2. The shifting movement of the slide or carriage 41 is effected by fluid pressure through operation of a piston 105 that is mounted within a cylinder 106 provided in the carriage 41. The piston 105 is fixed against movement, having a piston rod 107 formed integral with it that is secured by a nut 108 to a bracket 109. This bracket is rigidly fastened by screws 110 to the frame 40. Ducts 111 and 112 that are formed in the carriage 41 serve to conduct the motive fluid to opposite sides of the piston 106.

The shift of the cutters axially and the movement of the slide 41 toward or from the work are effected simultaneously. The directions of these movements are controlled by a rotary valve 115 (Figs. 4 and 8) that is suitably journalled in a chamber provided in the carriage 41. This valve is connected by the ducts 111 and 112 with opposite sides of the piston 105 and by the ducts 100 and 101 with opposite sides of the pistons 95 and 95'. Pressure is supplied to the valve chamber through a duct 117 and is exhausted from the valve chamber through a duct 118.

When the valve is in the position shown in Figs. 4 and 8, then, the ducts 101 and 111 are on supply and the ducts 100 and 112 are on exhaust; and the pistons 105, 95 and 95' are in the positions shown in these figures. When the valve 115 is reversed, however, the ducts 100 and 112 are put on supply and the ducts 101 and 111 on exhaust and the pistons 95 and 95' are shifted to the opposite end of their cylinders 98 and 98' while the cylinder 106 and carriage 41 are shifted with reference to the piston 105. In Fig. 4 the cutters are shown in finishing position. When the valve 115 is reversed, then, the cutters are shifted from the finishing position shown in Fig. 4 to roughing position and the carriage 41 is withdrawn the required amount.

In the machine illustrated, the rotary movement of the valve 115 is effected by operation of the cradle at opposite ends of the generating roll. For this purpose there are two spaced pawls 120 and 121 (Fig. 6) adjustably secured to the cradle 45. Each pawl is mounted upon a T-bolt 122 which engages in a circular T-slot 123 that is formed in the rear face of the cradle. The pawls are adapted to engage two ratchet wheels 124 and 125, respectively, that are keyed to the same shaft 126 (Figs. 7 and 4). The pawls are oppositely directed and the ratchet wheels have oppositely directed teeth 128 and 129, respectively. The pawl 120 is so disposed axially and angularly as to engage and actuate the ratchet wheel 124 at the end of counterclockwise roll (swing) of the cradle as viewed in Fig. 6, while the pawl 121 is so disposed axially and angularly as to engage and rotate the ratchet wheel 125 at the end of clockwise swing of the cradle as viewed in this figure. Thus, at opposite ends of the roll of the cradle, the shaft 126 is moved in opposite directions. The shaft 126 is connected by spur gears 130 and 131 (Fig. 4) with the shaft 132 to which the valve 115 is secured or with which the valve 115 is integral. Thus, at opposite ends of the roll of the cradle the valve 115 is reversed to effect shift of the cutters as required.

The work G, which is to be cut, is adapted to be mounted upon the work spindle of the machine which in turn is journalled in the work head 135 (Fig. 5). The work head is in turn adjustably mounted upon a swinging base 136. This is mounted for angular adjustment upon the sliding base 137 which is mounted on the frame 40 of the machine for movement toward and from the cradle. This structure may be of conventional design and may be, for instance, such as disclosed in my Patent No. 2,352,689, granted July 4, 1944.

During cutting, the work is rotated in time with the movement of the cradle, revolving in one direction during up-roll of the cradle and in the opposite direction during the return or down-roll of the cradle. The drive to the work is from the cradle worm shaft 140 (Fig. 4) through the bevel gearing 141, 142, 144, and the shaft 145. This shaft is operatively connected with a shaft 147 (Fig. 5) which is journalled in the sliding base 137 and which is connected by the spur gears 148 and 149, the bevel pinion 150, the bevel gear 151, the bevel gear 152, the bevel pinion 153, the diagonal shaft 154, the bevel gear 155, the bevel gear 156, the telescoping shaft 157, the bevel gears 158 and 159, the shaft 160 and the index change gears 161, 162, and 163, with the worm shaft (not shown) which drives the work spindle of the machine. This train of gearing may be of conventional design and may be like that disclosed in my earlier patent above mentioned.

As already stated, the cutters rough-cut a tooth space during roll in one direction; then are set over axially and depthwise, and finish-cut the tooth space during the return roll. At the end of the return roll of the cradle, the sliding base is moved to withdrawn position to withdraw the work from engagement with the cutters, and when the work is withdrawn, the work is indexed. Simultaneously with the withdrawal, the cutters will be shifted axially and also the slide 41 will be withdrawn so as to return the cutters to their roughing position. When indexing has been completed the sliding base is moved back to operative position, that is, toward the cradle to return the work into engagement with the now-shifted cutters to begin a new cutting cycle.

The means for indexing the work and for reversing the directions of the cradle and work rotations, and the means for moving the sliding base 137 toward and away from the cradle may be of conventional structure and may be of the same design as described in my prior patent above mentioned.

The angular adjustments of the cutter heads 50 and 51 about the axes of shafts 86 and 86', respectively, are an important feature of the machine of the present invention. These adjustments enable gears to be generated conjugate to various forms of basic generating gears. This is illustrated diagrammatically in Figs. 11 to 13 inclusive.

Z denotes the axis of cutter spindle 55; and Y is the axis of shaft 86 about which the head 50 swings in its adjustment. These axes are in the same plane P but axis Z is inclined to axis Y in accordance with the pressure angle of cutter 10, that is, in accordance with inclination of side-cutting edges 21 of cutter 10 to axis Z.

By angular adjustment of cutter head 50 about axis Y of shaft 86, then, plane P can be made parallel to axis X of the cradle or inclined at any desired angle relative to that axis. When plane P is parallel to axis X, the cutter represents a nominal crown gear, that is, a gear having a ninety degree face cone angle, but a pitch angle of slightly less than ninety degrees. This is the basic gear used in generation of tapered gears on conventional straight bevel gear generating machines.

Figure 12:
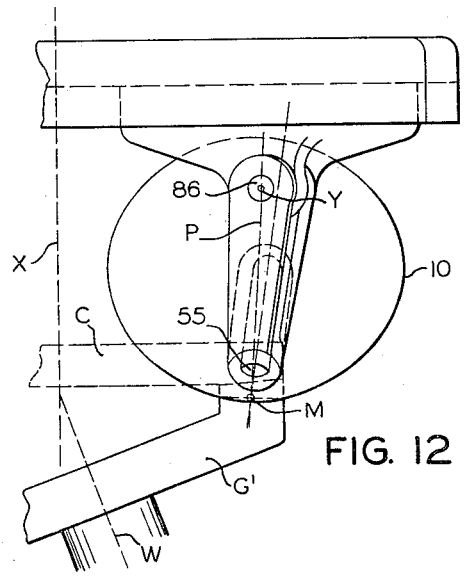
Fig. 12 is a diagrammatic view showing how the cutter may be adjusted angularly to permit cutting a gear conjugate to a true crown gear.

In the machine of the present invention, however, the cutter may be so adjusted about axis Y that it represents a true crown gear, that is, a gear having a ninety degree pitch angle. This is shown in Fig. 12. Here plane P is inclined to axis X at the dedendum angle of the crown gear, which is ordinarily about 2 or 3 degrees. When the cutter is rolled relative to the work G', then, by swing of the cradle on its axis X and simultaneous rotation of the work about the axis W of the work spindle, a tooth surface may be generated on the work which is conjugate to a true crown gear C.

Figure 13:
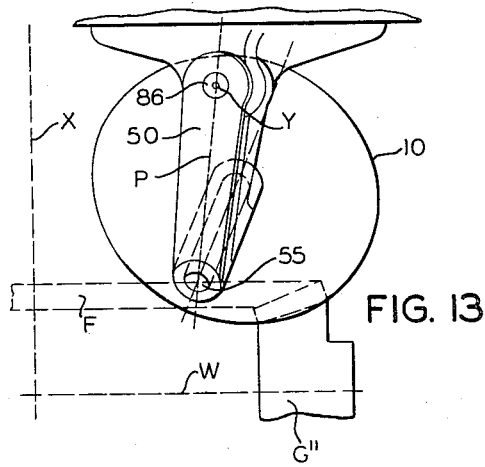
Fig. 13 is a diagrammatic view showing how the cutter may be adjusted angularly to permit cutting a pinion conjugate to a mate gear.

By the adjustment described, moreover, the tool 10 can be adjusted to represent a tooth surface of the mate gear of a gear to be cut so that the tooth surfaces of the work can be generated conjugate to the tooth surfaces of the mate. This is shown in Fig. 13. Here plane P is so inclined to the axis X of the cradle that the cutter 10 represents a tooth surface of the gear F which is to mate with the pinion G'' whose tooth surfaces are to be generated. Here the work axis W is at right angles to the axis X of the cradle, for the latter axis represents the axis of the mate gear and the two gears are to mesh at right angles.

Obviously by suitable angular adjustment about axis Y, the cutter can be positioned so that a plane tangent to its tip surface at the point of its contact with the root surface of the work is inclined at any desired angle to the axis of the cradle thereby to represent a tooth surface of any basic gear during generation. Moreover, through this adjustment and adjustment of the work spindle, tooth surfaces can be generated on the work which are exactly the same as the tooth surfaces that may be produced on the work without any generating roll. Thus the machine of this invention can be used to cut gears having profile tooth shapes that are identical with the profile shapes of the tools, as well as profile shapes that are envelopes of the profile shapes of the tools.

Figure 14:
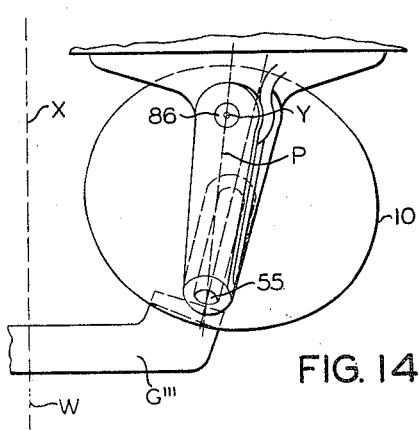
Fig. 14 is a diagrammatic view showing how a tapered gear may be generated according to the present invention to have the same tooth surfaces as though it had been form-cut.

The method, by which tooth surfaces may be generated on the work that are exactly the same as though they had been form-cut, is novel with the present invention. It is illustrated diagrammatically in Fig. 14. Here the cutter 10 is adjusted angularly about the axis Y in accordance with the root cone angle of the work G''' and the work spindle is adjusted so that its axis W is aligned with the axis X of the cradle. Then, by rotating the work spindle and cradle on their axes at the same rate, there will be no relative displacement between the cutter and the tooth surface of the work being cut, except the depthwise displacement of feed of the cutter into the work, and the tooth surfaces generated on the work will be the same as though the work were held stationary and the work axis were inclined to the cradle axis in accordance with its root cone angle.

What has been said relative to adjustment of cutter 10 and cutter head 50 about the axis Y of shaft 86 applies equally to adjustment of cutter 11 and cutter head 51 about the axis of shaft 86'. Hence the two cutters can be adjusted to represent a tooth of any desired basic gear in generation of a workpiece, or to generate any desired tapered gear or face-clutch member in the equivalent of a form-cutting process.

In Figs. 12 to 13 inclusive it will be noted that the cutter is adjusted to cut the desired tooth space depth at the tooth ends, cutting to greater depth between the tooth ends. If desired, however, the root plane of the work may be tangent to the tip surface of the cutter at the median point lengthwise of the tooth space. In this latter case, the tooth space will be of shallow depth at its ends. In either case the cutter is preferably so adjusted that the plane P is perpendicular to the root plane at a mean point M in the length of the tooth space. The cutting plane of the work, that is a plane tangent to the tip surface of the cutter, is then inclined to the axis X at the angle required to cut the required root surface on the work. What has been said about one cutter applies, of course, to both cutters since they are similarly adjusted.

While the invention has been described in connection with the use of cutters having side-cutting edges at one side which lie in planes perpendicular to the axes of the cutters, it will be understood that this side of the cutter might instead be dished or hollow so that its cutting edges lie in an internal conical surface coaxial of the cutter. Such a cutter will cut longitudinally crowned tooth surfaces on the work which will have a localized bearing in mesh with mating tooth surfaces of a mating gear or coupling (clutch). It will further be understood that the side-cutting edges of the cutters need not be straight. They may be of circular arcuate, involute, or other desired shape.

While the invention has been described, also, in connection with an operation in which a tooth space is rough-cut during roll of the cutters and work in one direction and the same tooth space is finish-cut during the return roll of the cutters and work, it is obvious that the invention may be carried out in various other ways. Thus, cutting might be effected only during roll in one direction and indexing effected during the return roll. In this case, all of the tooth spaces of the work might first be rough-cut; then the cutters might be shifted to move them from roughing to finish-cutting positions and then all of the tooth spaces might be finish-cut. This requires that the blank be inndexed through two revolutions before it is completed.

Various other ways in which the purpose of this invention may be accomplished will be obvious to those skilled in the art. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting the tooth surfaces of a gear or the like which comprises positioning a disc milling cutter, which has side-cutting edges at opposite sides, in engagement with the work so that its axis is inclined to the pitch plane of the work, rotating the cutter in engagement with the work to rough-cut one side of a tooth space of the work with the side-cutting edges, which lie at one side of the cutter, then shifting the cutter axially and depthwise relative to the work to bring the cutting edges at the opposite side of the cutter into engagement with the opposite side of the tooth space, and finish-cutting the opposite side of the tooth space with the side-cutting edges which lie at the opposite side of the cutter by rotating the cutter in engagement with the work.

2. The method of cutting the tooth surfaces of a gear or the like which comprises positioning a disc milling cutter, that has side-cutting edges at one side which lie in a plane perpendicular to the axis of the cutter and side-cutting edges at the opposite side which lie in a conical surface coaxial of the cutter, in engagement with the work with the axis of the cutter inclined to the pitch surface of the work in accordance with the pressure angle of the tooth surfaces that are to be cut, and rotating the cutter in engagement with the work to rough-cut one side of a tooth space of the work with the side-cutting edges at the second-named side of the cutter, then shifting the cutter axially and depthwise relative to the work, and finish-cutting the opposite side of the tooth space with the side-cutting edges that lie in the plane surface.

3. The method of cutting the tooth spaces of a gear or the like which comprises positioning two disc-milling cutters, each of which has a plurality of spaced cutting blades arranged around its periphery, and each of which has side cutting edges at opposite sides, in engagement with the work so that the blades of the two cutters will intermesh as the cutters rotate and so that the side-cutting edges at one side of each cutter will be offset laterally with reference to the adjacent side-cutting edges of the other cutter, and rotating the two cutters on their axes to cut opposite sides of a tooth space of the work with the more remotely spaced side-cutting edges of the two cutters, then shifting the two cutters relatively to one another to bring the side-cutting edges at the opposite side of each cutter into engagement with the opposite sides of the tooth space, and cutting the opposite sides of the tooth space with these latter side-cutting edges of the cutter.

4. The method of cutting the tooth spaces of a gear or the like which comprises positioning two disc milling cutters, each of which has a plurality of spaced cutting blades arranged around its periphery, and each of which has side-cutting edges at one side that lie in a plane perpendicular to the axis of the cutter and side-cutting edges at its opposite side that lie in a conical surface coaxial of the cutter, in engagement with the work so that the blades of the two cutters will intermesh as the cutters rotate and so that the conical side-cutting surfaces of the cutters will operate upon opposite sides of a tooth space of the work and the plane side-cutting surfaces of the cutters will be inclined to one another at the included angle of the tooth space to be cut, and rotating the cutters on their axes to rough-cut the sides of the tooth space, and then shifting the cutters axially and depthwise to bring the plane side-cutting surfaces of the cutters into engagement with opposite sides of the tooth space and continuing the cutting until these latter surfaces finish-cut the sides of the tooth space.

5. The method of cutting the tooth surfaces of a gear or the like which comprises employing a pair of milling cutters, each of which has a plurality of spaced cutting blades arranged around its periphery and each of which has side-cutting edges at opposite sides, positioning said cutters so that the blades of the two cutters will intermesh as the cutters rotate and so that the side-cutting edges at one side of each cutter will be offset laterally with reference to the adjacent side-cutting edges of the other cutter, and rotating the cutters in engagement with the work while producing a relative rolling motion between the cutters and work to rough-generate the tooth spaces of the work with said laterally offset side-cutting edges, then shifting the cutters relative to one another to bring the side-cutting edges at the opposite side of each cutter into cutting position and finish-cutting the tooth spaces of the work by rotating the cutters in engagement with the work while rolling the cutters relative to the work.

6. The method of cutting the tooth surfaces of a gear or the like which comprises employing a pair of milling cutters, each of which has a plurality of spaced cutting blades arranged around its periphery and each of which has side-cutting edges at opposite sides, positioning said cutters so that the blades of the two cutters will intermesh as the cutters rotate and so that the side-cutting edges at one side of each cutter will be offset laterally with reference to the adjacent side-cutting edges of the other cutter, and rotating the cutters in engagement with the work while producing a relative rolling motion between the cutters and work in one direction to rough-generate a tooth space of the work with said laterally offset side-cutting edges, then shifting the cutters relative to one another to bring the side-cutting edges at the opposite side of each cutter into cutting position and finish-cutting the tooth space of the work by rotating the cutters in engagement with the work while rolling the cutters relative to the work in the opposite direction.

7. The method of cutting the tooth surfaces of a gear or the like which comprises employing a pair of milling cutters, each of which has a plurality of spaced cutting blades arranged around its periphery and each of which has side-cutting edges at opposite sides, positioning said cutters so that the blades of the two cutters will intermesh as the cutters rotate and so that the cutting edges at one side of each cutter will operate, respectively, on opposite sides of a tooth space of the work, and rotating the cutters in engagement with the work while producing a relative rolling motion between the cutters and work, then shifting the cutters axially and depthwise to bring the side-cutting edges at the opposite side of each cutter into operative relation, respectively, with a tooth space of the work, and rotating the cutters in engagement with the work while rolling the cutters relative to the work.

8. The mehod of cutting the tooth surfaces of a gear or the like which comprises employing a pair of milling cutters, each of which has a plurality of spaced cutting blades arranged around its periphery and each of which has side-cutting edges at opposite sides, positioning said cutters so that the blades of the two cutters will intermesh as the cutters rotate and so that the cutting edges at one side of each cutter will operate, respectively, on opposite sides of a tooth space of the work, and rotating the cutters in engagement with the work while producing a relative rolling motion between the cutters and work in one direction, then shifting the cutters axially and depthwise to bring the side-cutting edges at the opposite side of each cutter into operative relation, respectively, with the tooth space of the work, and rotating the cutters in engagement with the work while rolling the cutters relative to the work in the opposite direction.

9. The method of cutting the tooth surfaces of a gear or the like which comprises employing a pair of milling cutters, each of which has a plurality of spaced cutting blades arranged around its periphery and each of which has straight side-cutting edges at one side that lie in a plane perpendicular to the axis of the cutter and straight side-cutting edges at its opposite side that lie in a conical surface coaxial of the cutter, positioning said cutters in engagement with the work so that the blades of the two cutters will intermesh as the two cutters rotate and so that the conical side-cutting surfaces of the cutters will operate upon opposite sides of a tooth space and the plane side-cutting surfaces will be inclined to one another at the included angle of the tooth space to be cut, and rotating the cutters on their axes while effecting a relative rolling movement between cutters and work, then shifting the cutters axially and depthwise to bring the plane side-cutting surfaces into operative position, and rotating the cutters while effecting a relative rolling movement between cutters and work.

10. The method of cutting the tooth surfaces of a gear or the like which comprises employing a pair of milling cutters, each of which has a plurality of spaced cutting blades arranged around its periphery and each of which has straight side-cutting edges at one side that lie in a plane perpendicular to the axis of the cutter and straight side-cutting edges at its opposite side that lie in a conical surface coaxial of the cutter, positioning said cutters in engagement with the work so that the blades of the two cutters will intermesh as the two cutters rotate and so that the conical side-cutting surfaces of the cutters will operate upon opposite sides of a tooth space and the plane side-cutting surfaces will be inclined to one another at the included angle of the tooth space to be cut, and rotating the cutters on their axes while effecting a relative rolling movement between cutters and work in one direction, then shifting the cutters axially and depthwise to bring the plane side-cutting surfaces into operative position, and rotating the cutters while effecting a relative rolling movement between cutters and work in the opposite direction.

11. A machine for producing gears comprising a frame, a work support and a tool support mounted on the frame, a work spindle journalled in the work support, a pair of disc-milling cutters journalled in the tool support, each of which has a plurality of spaced cutting blades arranged around its periphery and each of which has cutting edges at opposite sides, means for rotating the cutters in engagement with the work so that their blades cut alternately in the same tooth space of the work, and means for shifting the cutters axially and depthwise relative to the work to withdraw the cutting edges at one side of each cutter from operative engagement with the work and bring the cutting edges at the opposite side of the cutter into operative engagement with the work.

12. A machine for producing gears comprising a frame, a work support and a tool support mounted on the frame, a work spindle journalled in the work support, a pair of disc-milling cutters journalled in the tool support, each of which has a plurality of spaced cutting blades arranged around its periphery and each of which has cutting edges at opposite sides, means for rotating the cutters in engagement with the work so that their blades cut alternately in the same tooth space of the work, and means for shifting the cutters periodically relative to the work to withdraw the cutting edges at one side of each cutter from operative engagement with one side of a tooth space of the work and bring the cutting edges at the opposite side of the cutter into operative engagement with the opposite side of the tooth space.

13. A machine for producing gears comprising a frame, a work support and a tool support mounted on the frame, a work spindle journalled in the work support, a pair of disc-milling cutters journalled in the tool support, each of which has a plurality of spaced cutting blades arranged around its periphery and each of which has side-cutting edges at opposite sides, means for rotating the cutters in engagement with the work so that their blades cut alternately in a tooth space of the work, means for effecting a relative rolling movement between the cutters and work first in one direction and then in the other, and means for shifting the cutters relative to the work between relative rolls in opposite directions to withdraw the cutting edges at one side of each cutter from operative engagement with one side of a tooth space of the work and bring the cutting edges at the opposite side of each cutter into operative engagement with the opposite side of the tooth space.

14. A machine for producing gears comprising a frame, a work support mounted on the frame, a work spindle journalled therein, a tool support mounted on the frame for sliding movement toward and from the work, a pair of disc-milling cutters rotatably journalled in the tool support and axially shiftable therein, each of which has a plurality of spaced cutting blades arranged around its periphery and each of which has cutting edges at opposite sides, means for rotating the cutters in engagement with the work so that their blades cut alternately in a tooth space of the work, and means for simultaneously shifting the tool support and the cutters to withdraw the cutting edges at one side of each cutter from operative engagement with one side of a tooth space of the work and bring the cutting edges at the opposite side of each cutter into operative engagement with the opposite side of the tooth space.

15. A machine for producing gears comprising a frame, a work support mounted on the frame, a work spindle journalled therein, a tool support mounted on the frame, a pair of disc-milling cutters rotatably journalled in the tool support with their axes inclined to one another at the supplement of the included angle between sides of a tooth space of the work to be cut, each of said cutters being mounted in the tool support to be axially shiftable therein, each of said cutters having side-cutting edges at opposite sides which are inclined to one another at the included angle of a tooth space of the work to be cut, means for rotating the cutters in engagement with the work so that their blades cut alternately in a tooth space of the work, and means for shifting the cutters depthwise relative to the work and for simultaneously shifting them axially to withdraw the cutting edges at one side of each cutter from operative engagement with one side of a tooth space of the work and bring the cutting edges at the opposite side of each cutter into operative engagement with the opposite side of the tooth space.

16. A machine for producing gears comprising a frame, a work support mounted on the frame, a work spindle journalled therein, a tool support mounted on the frame, a pair of disc-milling cutters rotatably journalled in the tool support with their axes inclined to one another at the supplement of the included angle between sides of a tooth space of the work to be cut, each of said cutters being mounted in the tool support to be axially shiftable therein, each of said cutters having side-cutting edges at one side which lie in a plane perpendicular to the axis of the cutter and at the opposite side which lie in a conical surface coaxial of the cutter, means for rotating the cutters in engagement with the work so that their blades cut alternately in a tooth space of the work, means for effecting a relative rolling movement between tool and work supports first in one direction and then in the other and means for shifting the cutters depthwise relative to the work and for simultaneously shifting them axially between relative rolls in opposite directions, to withdraw the cutting edges at one side of each cutter from operative engagement with one side of a tooth space of the work and bring the cutting edges at the opposite side of each cutter into operative engagement with the opposite side of the tooth space.

17. A machine for producing gears comprising a frame, a work support slidably mounted on the frame, a work spindle journalled therein, a slide mounted on the frame for movement toward and from the work in the direction of movement of the work support, a cradle journalled in the slide, a tool support mounted on the cradle, a pair of disc-milling cutters rotatably journalled in the tool support with their axes inclined to one another at the supplement of the included angle between opposite sides of a tooth space of the work to be cut, each of said cutters having a plurality of spaced cutting blades arranged around its periphery and having side-cutting edges at opposite sides which are inclined to one another at an angle equal to the included angle between opposite sides of a tooth space of the work, means for rotating the cutters in engagement with the work so that their blades cut alternately in a tooth space of the work, means for rotating the cradle and work spindle in timed relation first in one direction and then in the other, means for shifting the cutters axially and for simultaneously shifting the slide between movements of work spindle and cradle in opposite directions, and means for periodically withdrawing the work support from the tool support and for indexing the work spindle when the work support is withdrawn.

18. A machine for cutting gears and the like, comprising an oscillatory cradle, a work support and a tool support, one of which is mounted on the cradle, said tool support being adjustable angularly about the axis of the cradle, a slide mounted on the tool support for adjustment rectilinearly on said tool support, a tool head mounted on said slide for adjustment angularly about an axis extending at right angles to the cradle axis, and a disc-miling cutter journalled in said tool head.

19. A machine for cutting gears and the like comprising a work support, a work spindle journalled therein, an oscillatory cradle, a pair of arms adjustable angularly on the cradle about the axis of the cradle, a slide mounted on each arm for rectilinear adjustment thereon, a tool head mounted on each slide for adjustment thereon about an axis perpendicular to the axis of the cradle, a disc-milling cutter journalled in each tool head, said disc-milling cutters having side-cutting edges at opposite sides thereof for cutting opposite side tooth surfaces of the work, means for rotating the cutters, and means for swinging the cradle and rotating the work spindle in timed relation thereto.

20. A machine for cutting gears and the like, comprising a frame, a work support adjustable angularly on the frame, a work spindle journalled in the work support with its axis extending at right angles to the axis about which the work support is adjustable, a tool support mounted on the frame for adjustment about an axis extending at right angles to the axis of adjustment of the work support, a tool head mounted on the tool support for adjustment about an axis extending at right angles to the axis of adjustment of the tool support, and a disc-milling cutter journalled in the tool head.

21. A machine for cutting gears and the like, comprising a frame, a work support adjustable angularly on the frame, a work spindle journalled in the work support with its axis extending at right angles to the axis about which the work support is adjustable, a pair of arms adjustable on the frame about an axis extending at right angles to the axis of adjustment of the work support, a tool head mounted on each arm for adjustment about an axis extending at right angles to the axis of adjustment of the arm, a disc-milling cutter journalled in each tool head, each cutter having opposite side-cutting edges for cutting opposite sides of a tooth space of the work, means for rotating the cutters, and means for periodically shifting the cutters axially and depthwise.

22. A machine for cutting gears and the like, comprising a frame, a cradle journalled in the frame, a work support adjustable angularly about an axis which extends at right angles to the axis of the cradle, a work spindle journalled in the work support with its axis extending at right angles to the axis about which the work support is adjustable, a pair of arms mounted on the cradle for adjustment about the axis of the cradle, a tool head mounted on each arm for adjustment about an axis extending at right angles to the axis of adjustment of the arm, a disc-milling cutter journalled in each tool head with its axis lying in the same plane as the axis of adjustment of the head, each cutter having opposite side-cutting edges, means for rotating the cutters, means for swinging the cradle in opposite directions, means for rotating the work spindle in opposite directions in time with the cradle movement, and means for shifting the cutters axially and depthwise of the work in opposite directions at opposite ends of the cradle movement.

23. The method of generating a tapered gear, face clutch member, or the like, which comprises rotating a cutter in engagement with the work, while rotating the work on its axis and simultaneously effecting an additional motion between the tool and work about an axis aligned with the work axis and at the same rate as the rotation of the work, the cutter being positioned relative to the work so that it cuts a root surface on the work which is inclined to said axes at the root cone angle of the work.

24. The method of generating a tapered gear, face clutch member, or the like, which comprises rotating a disc-milling cutter that has cutting edges at one side inclined to its axis at an angle equal to the pressure angle of the tooth surfaces to be cut, in engagement with the work, while rotating the work on its axis and simultaneously effecting an additional motion between the tool and work about an axis aligned with the work axis and at the same rate as the rotation of the work, the cutter being adjusted angularly about an axis, which lies in the same plane as the cutter axis, so that its cutting plane is inclined to the axis of the work at the root angle of the work.

25. The method of generating a tapered gear, face clutch member or the like, which comprises positioning a pair of disc-milling cutters, each of which has a plurality of spaced cutting blades arranged around its periphery, and each of which has side-cutting edges at opposite sides, in engagement with the work so that the blades of the two cutters will intermesh as the cutters rotate and so that the side-cutting edges at one side of each cutter will be offset laterally with reference to the adjacent side-cutting edges of the other cutter and so that the cutting planes of the two cutters are inclined to the axis of the work at the root angle of the work, and rotating the cutters on their respective axes while rotating the work on its axis first in one direction and then in the other and simultaneously effecting an additional motion between the cutters and work first in one direction and then in the other about an axis aligned with the work axis and at the same rate as the rotation of the work, and shifting the cutters axially and depthwise between reversal of the work rotation and of said last-named relative motion, whereby cutting will be effected during the motions in opposite directions by side-cutting edges at opposite sides of the cutters.

LEONARD O. CARLSEN.

REFERENCES CITED

The following references are of record in the file of this patent:

UNITED STATES PATENTS

| Number | Name | Date |
| --- | --- | --- |
| 795,021 | Beale | July 18, 1905 |
| 1,370,573 | Wingqvist | Mar. 8, 1921 |
| 1,474,500 | Wingqvist | Nov. 20, 1923 |
| 2,136,266 | Reinecker | Nov. 8, 1938 |

FOREIGN PATENTS

| Number | Country | Date |
| --- | --- | --- |
| 535,236 | Germany | Oct. 9, 1931 |